C. L. Spencer.
Converting Motion.

No 1547.

Reissued Sept. 29 1863.

Witnesses:

G. Breed

A Browne

Inventor:

Daniel Breed
Atty for L. Spencer

UNITED STATES PATENT OFFICE.

CHARLES L. SPENCER, OF NEW YORK, N. Y.

IMPROVEMENT IN CONVERTING MOTION.

Specification forming part of Letters Patent No. 34,597, dated March 4, 1862; Reissue No. 1,517, dated September 29, 1863.

DIVISION B.

*To all whom it may concern:*

Be it known that I, CHARLES L. SPENCER, of the city, county, and State of New York, have invented certain new and useful Improvements in the Mode of Converting Motion; and I do hereby declare that the following is a full description of the same, reference being had to the accompanying drawings and to the letters of reference marked thereon.

The object of my invention is to convert reciprocating motion into rotary motion in such manner as to overcome the dead-centers of crank-motion, prevent the jarring usually occasioned by reversing the stroke, avoid the possibility of turning the machine the wrong way, and enable the machine to be moved slowly when desired, even at the start.

In the accompanying drawings I have represented my invention as applied to a sewing-machine, but I propose to use my invention in any desirable application and with different machinery for converting motion.

My invention consists in the combination of two hubs provided with crank-arms and friction-roller clutches and so arranged as to act alternately in the same direction, giving a continuous rotary motion, without the possibility of a dead center or of turning the machine the wrong way.

Figure 1:
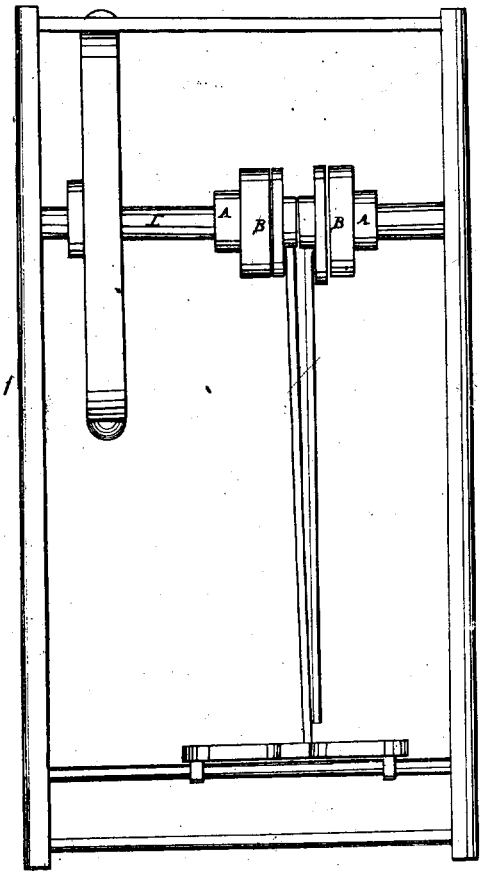
Figure 2:
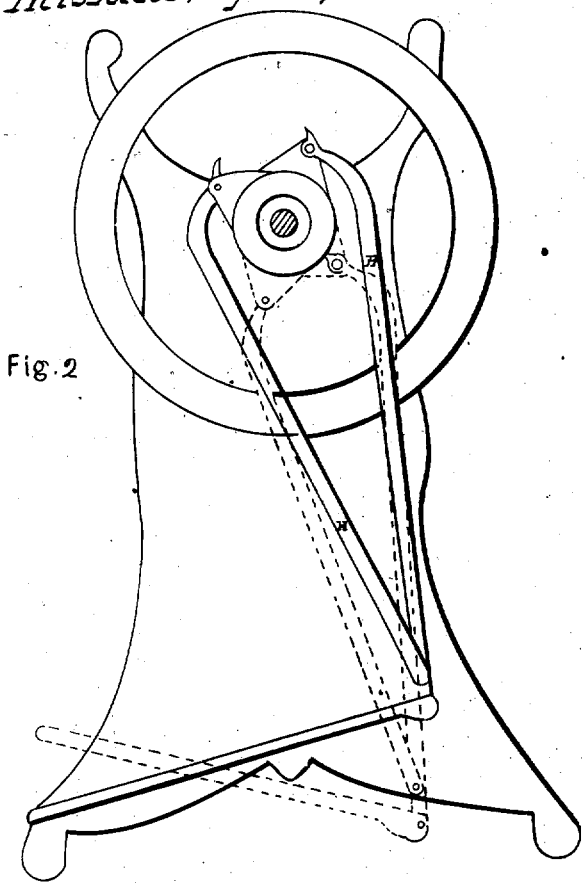
Figure 3:
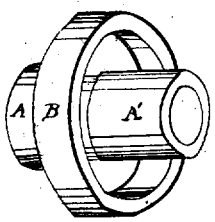
Figure 4:
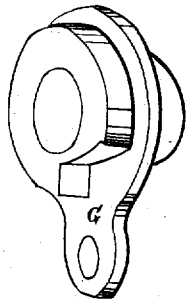
Figure 5:
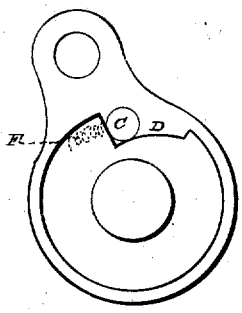
Figure 6:
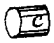
Figure 7:
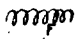

In the accompanying drawings, Figure 1 represents the stand of a sewing-machine with my improvements attached. Fig. 2 is a vertical section of the same, showing the reverse stroke in red lines. Figs. 3 and 4 are separated parts of the divided hub. Fig. 5 is a direct view of the part, Fig. 4, showing the friction-roller and spring in place. Fig. 6 is a detached view of the friction-roller. Fig. 7 is a view of the coiled spring.

In my improvement for converting motion two hubs are employed, as seen in Fig. 1, the connecting-rods of the two hubs being united and receiving one and the same motion from a treadle or other means. In operating the machine one of these hubs is clutched to the axle and acts while the other plays loose, so that the two connecting-rods work on opposite sides of the axle, as seen in Fig. 2.

The construction of my hubs is shown in Figs. 3, 4, and 5. The main part of the hub, Fig. 3, is provided with a sleeve, A A′, intended to slide onto the axle, and to be fixed there by a set-screw inserted through the sleeve, so as to bear upon the axle. This main part of the hub is made with a cup-formed portion, B, for embracing the clutch, the inner side of rim B affording a bearing for the friction roller or rollers. The other portion of the hub is seen at Fig. 4. It is made to slide upon sleeve A′, Fig. 3, and is held thereon by a set-screw, the point of which enters a groove in the sleeve, so that the two divisions of the hub revolve freely upon each other, while they cannot move to the right or left in relation to each other. This division, Fig 4, of the hub has a crank-arm, G, for the attachment of the connecting-rods H, Fig. 2. A friction-roller, C, Fig. 6, and a coiled spring, F, Fig. 7, are arranged in connection with the eccentric bearing D, Fig. 5, in such a manner that the spring, being placed in a recess, will gently press the roller up the eccentric bearing D until it meets the rim B, Fig. 3, when the two parts of the hub are brought together, as seen in Fig. 1. By this arrangement the two divisions of the hub, Figs. 3 and 4, are locked together, when the crank-arm G is turned so as to carry the roller C up the eccentric bearing D, but the two divisions revolve freely upon each other when the crank-arm G is turned so as carry the roller H down the eccentric bearing D. Now, two such hubs being put upon the axle I, in reverse position to each other, as seen in Fig. 1, and motion being given to the crank-arm G, one of these arms is clutched while the other is free, so that they act alternately—one during the forward or downward stroke and the other during the reverse stroke—each giving a partial revolution to the axle I. The relation and action of the two branches of the connecting-rod are such that the stroke of one arm, G, carries the motion or revolution beyond the dead-center, so that the second arm begins to act before the stroke of the other is completed.

I do not claim the invention of a friction-clutch or the use of a single clutched crank-arm giving an interrupted positive motion; but I confine my claim to the combination of two hubs working together and alternately, thus giving a positive, continuous, rotary motion.

Having thus fully described my invention, what I claim, and desire to secure by Letters Patent of the United States, is—

Two hubs, each composed of the two parts G and B, in combination with friction-roller C, spring S, and axle I, so that each of the said hubs may be alternately fixed to said axle, one revolving loosely while the other is clutched and in action, for the purpose of producing a continuous rotary motion, in the manner and for the purpose herein set forth.

CHAS. L. SPENCER.

Witnesses:
EDWIN F. COREY,
EDWD. B. PEET.